US007028684B2

(12) United States Patent
Johnson (10) Patent No.: US 7,028,684 B2
(45) Date of Patent: Apr. 18, 2006

(54) BARBECUE GRILL FUEL SOURCE SUPPORT APPARATUS

(75) Inventor: Mark Johnson, Cary, IL (US)

(73) Assignee: Weber Stephen Products Co., Palatine, IL (US)

(*) Notice: Subject to any disclaimer, the term of this patent is extended or adjusted under 35 U.S.C. 154(b) by 0 days.

(21) Appl. No.: 10/914,993

(22) Filed: Aug. 10, 2004

(65) Prior Publication Data

US 2005/0051151 A1   Mar. 10, 2005

Related U.S. Application Data

(63) Continuation-in-part of application No. 10/319,421, filed on Dec. 13, 2002, now Pat. No. 6,910,476.

(51) Int. Cl.
*F24C 5/00*   (2006.01)

(52) U.S. Cl. .................. 126/41 R; 126/50; 126/39 B (58) Field of Classification Search ........... 126/41 RO, 126/50 X, 39 B, 40, 39 R, 9 B
See application file for complete search history.

(56) References Cited

U.S. PATENT DOCUMENTS

| D176,294 S | 12/1955 | Webster |
| D177,293 S | 3/1956 | Webster |
| D179,334 S | 11/1956 | Webster |
| D186,967 S | 12/1959 | Webster |
| 2,954,024 A * | 9/1960 | Webster ........................ 126/38 |
| 3,139,879 A * | 7/1964 | Bauer et al. ................... 126/4 |
| 3,219,025 A | 11/1965 | Webster |
| 3,430,622 A | 3/1969 | Webster et al. |
| 3,589,312 A | 6/1971 | Cooper |
| 3,643,645 A | 2/1972 | Benson |
| 3,802,413 A | 4/1974 | Pepin |
| 4,322,049 A | 3/1982 | Holland et al. |
| 4,413,515 A | 11/1983 | Quinn |
| 4,446,846 A * | 5/1984 | Hahn ........................ 126/25 R |
| 4,524,751 A | 6/1985 | Hoglund |
| 4,770,428 A | 9/1988 | Sugiyama |
| 4,788,962 A | 12/1988 | Mashburn et al. |
| 5,038,749 A * | 8/1991 | Jerry et al. .................... 126/40 |
| 5,203,317 A * | 4/1993 | James ....................... 126/41 R |
| 5,307,798 A * | 5/1994 | Overmars, Sr. .............. 126/40 |
| 5,408,985 A | 4/1995 | Giebel et al. |
| 5,458,309 A | 10/1995 | Craven, Jr. et al. |

(Continued)

*Primary Examiner*—Alfred Basichas
(74) *Attorney, Agent, or Firm*—David I. Roche; Baker & McKenzie LLP (57) ABSTRACT

The present invention provides a barbecue grill assembly having a cooking chamber with a burner element and a base assembly configured to support the cooking chamber. The grill assembly further includes a support apparatus for a fuel bottle in fluid communication with the burner element. A first support apparatus has an elongated segment that defines a receiver to engage the fuel bottle in an angled position. A second support apparatus has a first member defining a first receiver configured to receive a first-sized fuel container and a second member defining a second receiver configured to receive a second-sized fuel container. The first member is moveable between a first position wherein the first receiver receives a portion of a first-sized fuel container, and a second position wherein the second receiver receives a portion of the second-sized fuel container. A third support apparatus has a first member operably connected to a generally stationary second member. The first member includes a receiver to receive a fuel bottle in a substantially vertical position. The second member has a locking element that releasably secures the first member in a locked position during use.

23 Claims, 7 Drawing Sheets

U.S. PATENT DOCUMENTS

| | | |
|---|---|---|
| 5,782,230 A | 7/1998 | Linnebur et al. |
| 5,799,849 A | 9/1998 | Beer et al. |
| 5,873,355 A * | 2/1999 | Schlosser et al. ......... 126/41 R |
| 5,931,149 A | 8/1999 | Lewis |
| 5,970,971 A | 10/1999 | Wu |
| 5,983,883 A * | 11/1999 | Moulder ..................... 126/38 |
| 6,003,506 A | 12/1999 | Long et al. |
| 6,293,273 B1 | 9/2001 | Byrne et al. |

* cited by examiner

BARBECUE GRILL FUEL SOURCE SUPPORT APPARATUS

CROSS-REFERENCE TO RELATED APPLICATIONS

The subject matter of this application is a continuation-in-part application of U.S. application Ser. No. 10/319,421 now U.S. Pat. No. 6,910,476, filed on Dec. 13, 2002.

FEDERALLY SPONSORED RESEARCH OR DEVELOPMENT

Not Applicable.

TECHNICAL FIELD

The present invention relates to a portable barbecue grill assembly with a support apparatus for a small fuel source. More specifically, the present invention relates to a compact, portable barbecue grill assembly with a support apparatus for supporting the fuel source.

BACKGROUND OF THE INVENTION

Barbecue grills have grown in popularity in recent years. There are two primary types of barbecue grills commonly used: gas grills and solid fuel grills. Gas barbecue grills employ a gas burner element or group of burners to cook food that is supported on a grate above the burner(s). The fuel source for gas barbecue grills is typically liquid propane or natural gas that is stored for use in a fuel tank or bottle. A fuel bottle is typically utilized in connection with portable barbecue grills, while a larger fuel tank is utilized for stationary barbecue grills. In the United States, conventional fuel bottles are available in one of two standard sizes. In other countries, a number of fuel bottle sizes are available; however, one size is typically utilized. Solid fuel barbecue grills use combustible solid fuel, typically charcoal, to cook the food. As a result, this type of grill is commonly referred to as a charcoal barbecue grill. Some conventional charcoal barbecue grills utilize a smaller fuel tank to aid with the ignition of the charcoal. Regardless of the type, most barbecue grills have a cooking chamber that generally includes a cover and a firebox.

With respect to portable gas barbecue grills, the fuel bottle is the common variety of the fuel source. Conventional barbecue grills of this type typically do not include any structure(s) to house and/or support the fuel bottle while it is in fluid communication with the burner element. As a result, the fuel bottle remains unsupported during use of the portable gas barbecue. In the event that a conventional portable gas barbecue grill has a support structure for the fuel bottle, the support structure is crudely affixed to the grill support frame which necessitates additional components, such as hoses or lines, to ensure fluid communication between the fuel bottle and the burner element. The additional components can be cumbersome and generally increase the manufacturing cost of the portable barbecue grill.

Another aspect of fuel bottle support structures found in conventional portable barbecue grills is that the support structure is configured to accept only a single-sized fuel bottle. This means that the conventional support structure lacks the ability to receive different-sized fuel bottles. Thus, the operator of the portable barbecue grill is limited in the selection and use of fuel bottles. This limitation reduces the utility of fuel bottle support structures found in conventional portable barbecue grills.

Figure 1:
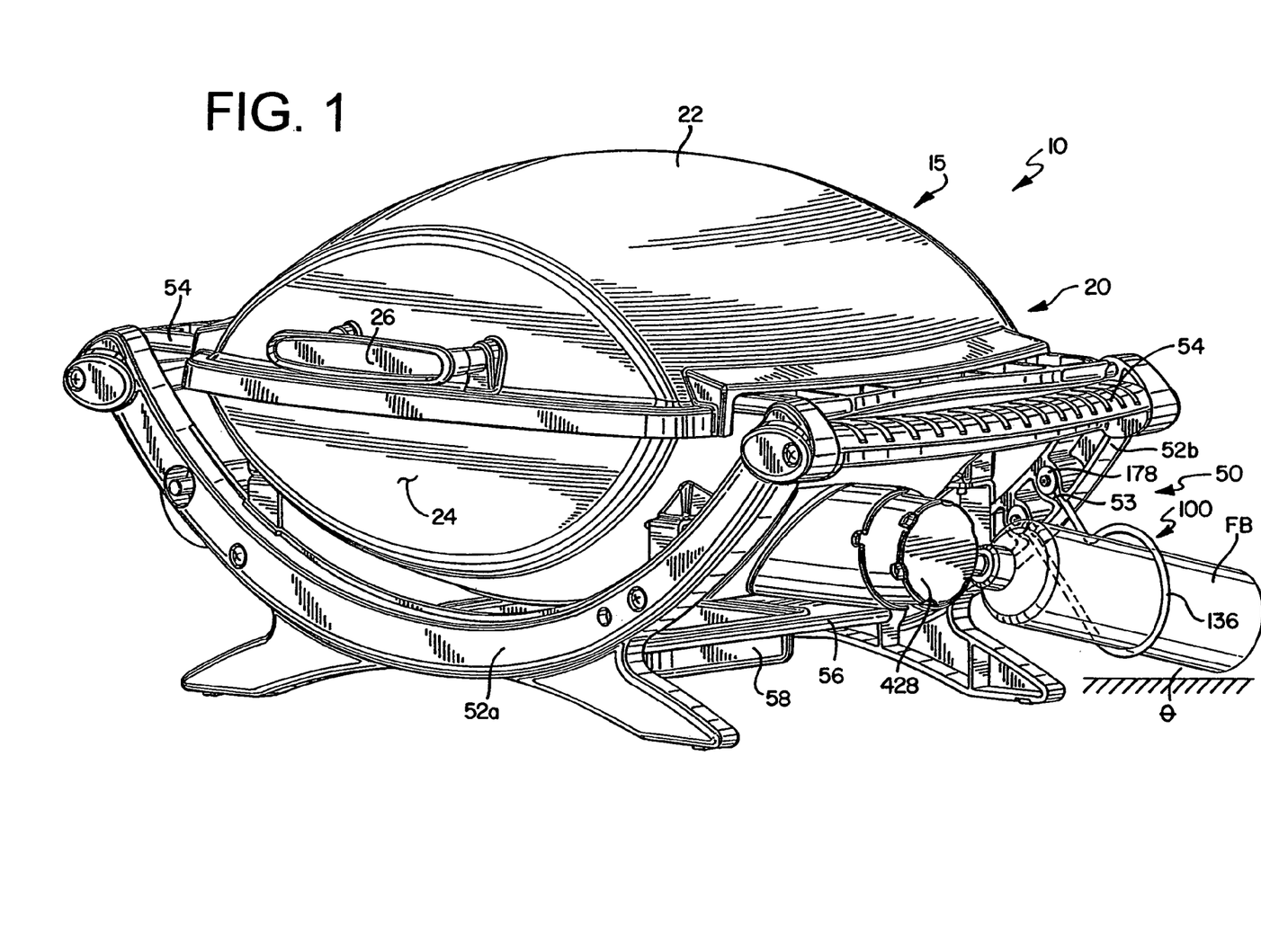
FIG. 1 is a perspective view of a barbecue grill assembly and a first support apparatus for a fuel source according to the invention.
Figure 2:
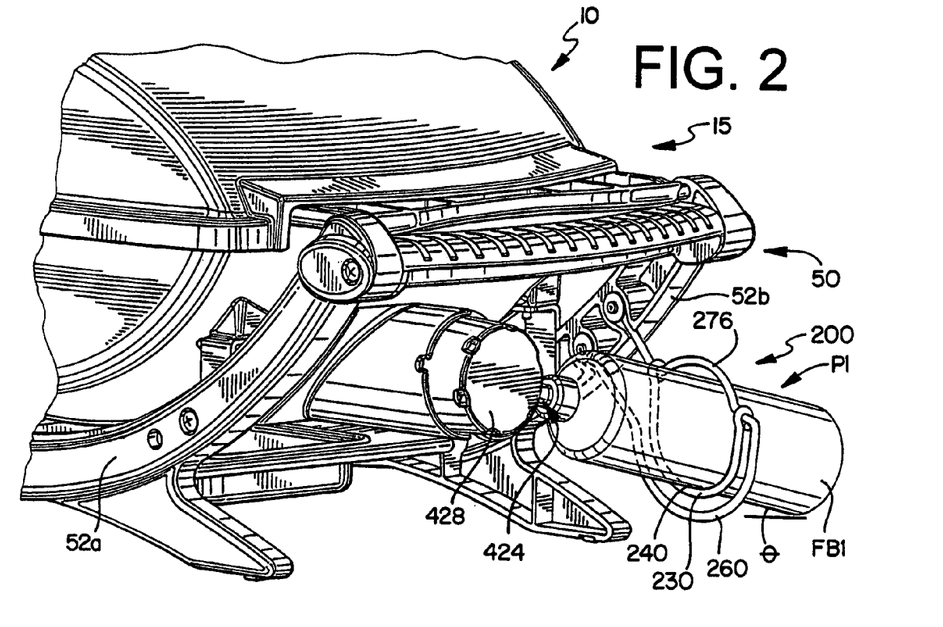
FIG. 2 is a partial perspective view of the barbecue grill assembly of FIG. 1 and a second support apparatus for a fuel source, showing the support structure in a first position.
Figure 3:
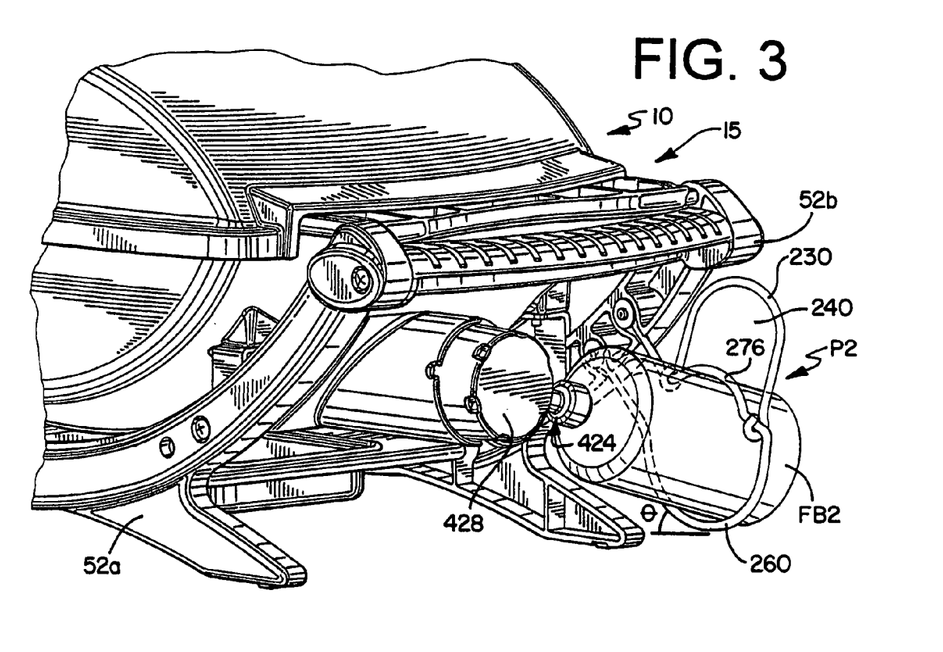
FIG. 3 is a partial perspective view of the barbecue grill assembly of FIG. 1 and the second support apparatus for a fuel source, showing the support structure in a second position.

One example of such a common portable barbecue grill having a limited fuel bottle support is shown in U.S. Pat. No. 3,332,339 to Helgeson et al. In FIGS. 1–3, a support ring 102 for the fuel bottle 80 extends from a side wall 28 of the portable grill 20. Since the support ring 102 extends from the side wall 28, a hose 82 is needed to direct fuel from the fuel bottle 80 to the burner element 86. In addition, the support ring 102 is a fixed structure that is not capable of adjustment or variance to accept different-sized fuel bottles Another example of the limitations of conventional portable barbecue grills is shown in U.S. Pat. No. 5,203,317 to James. Referring to FIGS. 1 and 2, a holder 42 extends from a side wall of the housing 38. Due to the positioning of the holder 42, a flexible conduit 44 is needed to distribute fuel from the bottle 41 through the valve 43 and to the burner element 37. The holder 42, a metallic strap or bracket, lacks adjustability to receive different-sized fuel bottles 41.

Despite the popularity of portable gas barbecue grills, there is a need for a fuel bottle support apparatus that is properly positioned to ensure direct connection with the regulator when the fuel bottle is in fluid communication with the burner element. Further, there is a need for a portable barbecue grill with a fuel bottle support apparatus that is capable of receiving and supporting different-sized fuel bottles. The present invention is provided to resolve these and other needs.

SUMMARY OF THE INVENTION

The present invention relates to a portable barbecue grill assembly with a cooking assembly having a cooking chamber with a burner element and a base assembly configured to support the cooking chamber. The barbecue grill assembly also includes a support apparatus for supporting the fuel container that supplies fuel to the burner element. The burner element is positioned generally below a cooking grate within a lower region of the cooking chamber. The burner element is in fluid communication with the fuel container or bottle, whereby fuel flows from the bottle to the burner element. A control valve or regulator is employed to regulate the flow of fuel from the fuel bottle. The portable barbecue grill assembly is positioned on a support surface, which can include the ground, a table top, or other horizontal surface. There is a fuel delivery height defined as the distance between the support surface and the regulator, which represents the connection point of the fuel bottle.

According to one aspect of the invention, the first support apparatus is connected to and extends in a generally downward direction from the cooking assembly. The support apparatus can depend from the base assembly. The support apparatus includes a proximal segment, a distal segment and an intermediate segment that defines a receiver configured to receive the elongated fuel bottle. The proximal segment has a connecting member and the distal segment has a connecting member wherein the connecting members are utilized to operably connect the support apparatus to the base assembly. At least an extent of the intermediate segment has an inner wall which defines an inner perimeter that is cooperatively dimensioned with an outer wall or dimension of the first-sized fuel bottle. In use, the fuel bottle is received by the receiver and positioned at a support angle θ. During use of the barbecue grill assembly, the fuel bottle is in fluid communication with the regulator in order to deliver fuel to the burner element.

According to another aspect of the invention, a second support apparatus is connected to and extends in a generally downward direction from the cooking assembly. The support apparatus includes a first member and a second member, wherein the first member is moveably connected to the second member. The first member defines a first receiver configured to receive and support a first-sized fuel bottle, and the second member defines a second receiver configured to receive and support a second-sized fuel bottle. Accordingly, the support apparatus can be selectively positioned to receive and support one of a variety of fuel sources while the fuel source is in fluid communication with the burner element of the cooking chamber. In use, the support apparatus can be selectively positioned to accommodate different-sized fuel source bottles. In a first position, the first receiver of the support apparatus receives and secures a first-sized fuel bottle at a support angle. In the first position, an engaging surface of the first receiver engages an extent of the outer wall of the fuel bottle. When a larger, second-sized fuel source bottle is utilized, the support apparatus can be selectively adjusted to a second position to accommodate the larger fuel bottle. In the second position, the second-sized fuel source bottle is received by and positioned at the support angle θ by the second member. In the second position, the engaging surface of the second receiver engages the outer wall of the second-sized fuel bottle. Therefore, the support apparatus can be selectively positioned in the first or second position to receive and support different-sized fuel source bottles while maintaining fluid communication with the burner element.

According to another aspect of the invention, a third support apparatus is connected to and extends in a generally downward direction from the cooking assembly. The support apparatus includes a first member and a second member, wherein the first member is moveably connected to the second member. The second member includes a locking member that releasably secures the first member. Accordingly, the support apparatus is moveable between a first or loading position where the fuel source is inserted in the support apparatus, and a second or use position wherein the fuel source is in fluid communication with the burner element of the cooking chamber. The first member includes connecting structures that operably connect the first frame member to the second frame member. The first member is moveable or rotatable about a generally vertical axis defined by an intermediate segment of the second frame member. The first member also includes a first curvilinear holding element affixed to a portion of the proximal segment. The first member further includes a second holding element affixed to a lower portion of the first member. The first and second holding elements define a receiver that is configured to receive the fuel container or bottle. The locking member releasably secures the first member and prevents unwanted movement between the first and second positions.

In use, the third support apparatus is moveable between the first or loading position wherein the fuel bottle can be inserted into the receiver of the support apparatus, and the second or use position wherein the fuel source is in fluid communication with the burner element of the cooking chamber. To move the support apparatus from the first position to the use or second position, the first member is rotated into engagement with the locking member. Accordingly, the support apparatus is moveable between the loading position and the use position; however, the positive engagement between the locking member and an extent of the first member 330 prevents unintended movement.

Other features and advantages of the invention will be apparent from the following specification taken in conjunction with the following drawings.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

The present invention provides a portable, compact barbecue grill assembly 10, as is shown in the Figures in the preferred form of the invention. The barbecue grill assembly 10 generally includes a cooking assembly 15 having a cooking chamber 20 and a base assembly 50. In the preferred embodiment, the base assembly 50 is a separate structure attached to the cooking chamber 20 for support thereto. In another embodiment, the base assembly 50 is an extension of the cooking chamber 20. The base assembly 50 is configured to provide support to the cooking chamber 20 and has a front structure 52a and a rear structure 52b. The cooking chamber 20 includes a cover 22 that is operably connected to a firebox 24. The cover 22 includes a handle 26 that can be grasped to raise and lower the cover 22. A grate (not shown), that defines a cooking surface upon which food is placed during operation of the grill assembly 10, is removably positioned generally within the cooking chamber 20. The base assembly 50 further includes a pair of transverse members 54 that extend between the front and rear structures 52a,b. A removable heat shield 56 with a disposable drip pan 58 is slidably received by a lower portion of the base assembly 50.

The cooking chamber 20 further includes a burner element (not shown) positioned generally below the cooking grate within the firebox 24. The burner element is in fluid communication with a fuel bottle or container FB, meaning that fuel from the fuel bottle FB flows to the burner element Referring to FIG. 1B, a gas distribution manifold 424 is configured to receive the fuel bottle FB. and regulates the flow of fuel from the fuel bottle FB to the burner element. Unlike those utilized in conventional portable barbecue grills, the gas manifold 424 includes distinct components—a fitting 426, a valve control knob 428, a regulator 430, and a valve (not shown) positioned between the knob 428 and the regulator 430. The control knob 428 actuates the an internal stem of the valve to control the flow there through. The regulator 430 can be set to regulate the pressure and/or flow rate of the fuel supplied by the fuel bottle FB. The barbecue grill assembly 10 is positioned on a support surface, which can include the ground, a table top, or other horizontal surface. There is a fuel delivery height H1 defined as the distance between the support surface and the center of the regulator 428, which represents the connection point of the fuel bottle FB. Due to compact dimensions of the barbecue grill assembly 10, the fuel delivery height H1 is less than that found with conventional barbecue grills.

Figure 1A:
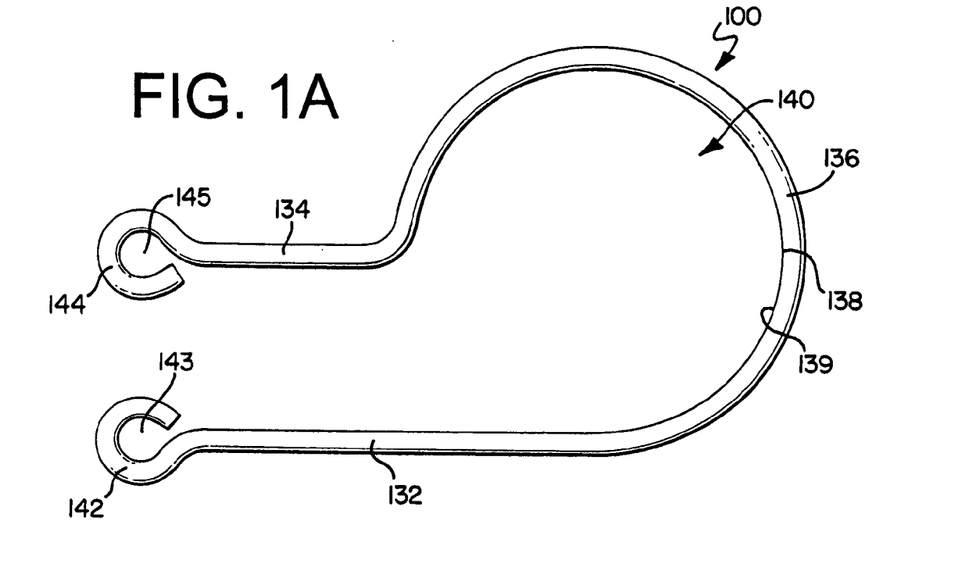
FIG. 1A is a plan view of the first support apparatus of FIG. 1.
Figure 1B:
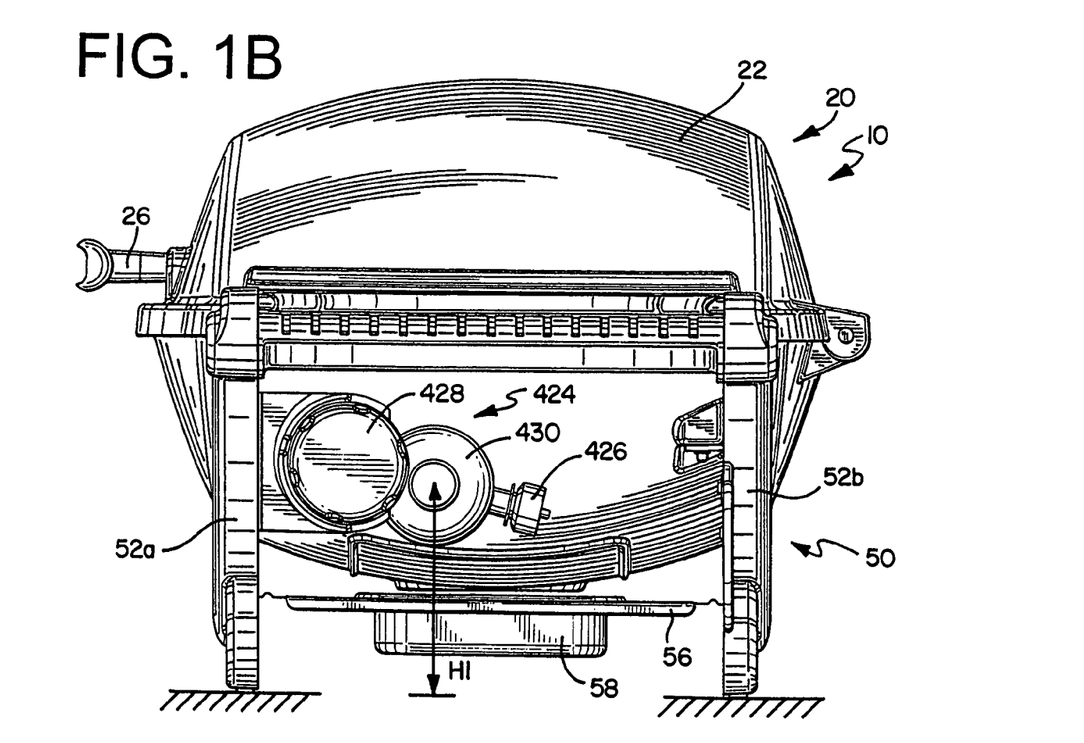
FIG. 1B is side view of the barbecue grill assembly of FIG. 1.

FIGS. 1 and 1A shows a first support apparatus 100 for an elongated fuel source or bottle FB. The support apparatus 100 is connected to and extends from the cooking assembly 15. In one embodiment, the support apparatus 100 is connected to and extends in a generally downward direction from the base assembly 52, for example, the rear structure 52b of the base assembly 50. Alternatively, the support apparatus 100 downwardly extends from the front frame structure 52a. As explained below, the support apparatus 100 defines a receiver 140 configured to receive and support the elongated fuel bottle FB.

Referring to FIG. 1A, the support apparatus 100 includes a proximal segment 132, a distal segment 134 and an intermediate segment 136. Preferably, the intermediate segment 136 has a curvilinear configuration. At least an extent of the intermediate segment 136 defines a receiver 140 that is configured to receive the elongated fuel bottle FB. The receiver 140 has an engaging surface that engages a portion of the fuel source FB when it is received by the receiver 140. Described in a different manner, the receiver 140 is cooperatively dimensioned with the outer dimension or wall(s) of the fuel source FB wherein the fuel source FB is inserted in and supported by the receiver 140. As shown in FIG. 1A, the proximal segment 132 has a connecting member or an eyelet 142 with an opening 143, and the distal segment 134 has a connecting member or an eyelet 144 with an opening 145. The connecting structures 142, 144 are utilized to operably connect the support apparatus 100 to the base assembly 50. Referring to FIG. 1, the rear frame structure 52b has at least one channel 53 that receives the proximal and distal segments 132, 134. A fastener 176 extends through the connecting members 142, 144. Also, washers 178 are utilized to further secure the proximal and distal segments 132, 134 in the channels 53. Although shown as an eyelet, the connecting structures 142, 144 can have a different configuration, such as a hook, to ensure the connection to base assembly 50. At least an extent of the intermediate segment 136 has an inner wall 138 which defines an inner perimeter 139 that is cooperatively dimensioned with an outer wall or dimension of the first-sized fuel bottle FBI.

In use, the fuel bottle FB is received by the receiver 140 of the support apparatus 100. The fuel bottle FB is positioned at a support angle θ (measured from the surface supporting the barbecue grill assembly 10) by the support apparatus 100. During use of the barbecue grill assembly 10, the fuel bottle FB is connected to and in fluid communication with the regulator 430 in order to deliver fuel to the burner element. The fuel bottle FB extends through the receiver 140 and is supported by the receiver 140 at the support angle θ. Therefore, the fuel bottle FB is held in place by the combination of the connection with the regulator 430 and the receiver 140 of the support apparatus 100. The support angle θ ensures the flow of the fuel from the fuel bottle FB to the gas manifold 424 and the regulator 430, and can vary between 5 and 60 degrees. In the event that the fuel delivery height H1 is increased, the regulator 430 is positioned a greater distance from the support surface and the support angle θ can be increased. Thus, the fuel bottle FB can be placed in a more upright position.

Figure 6:
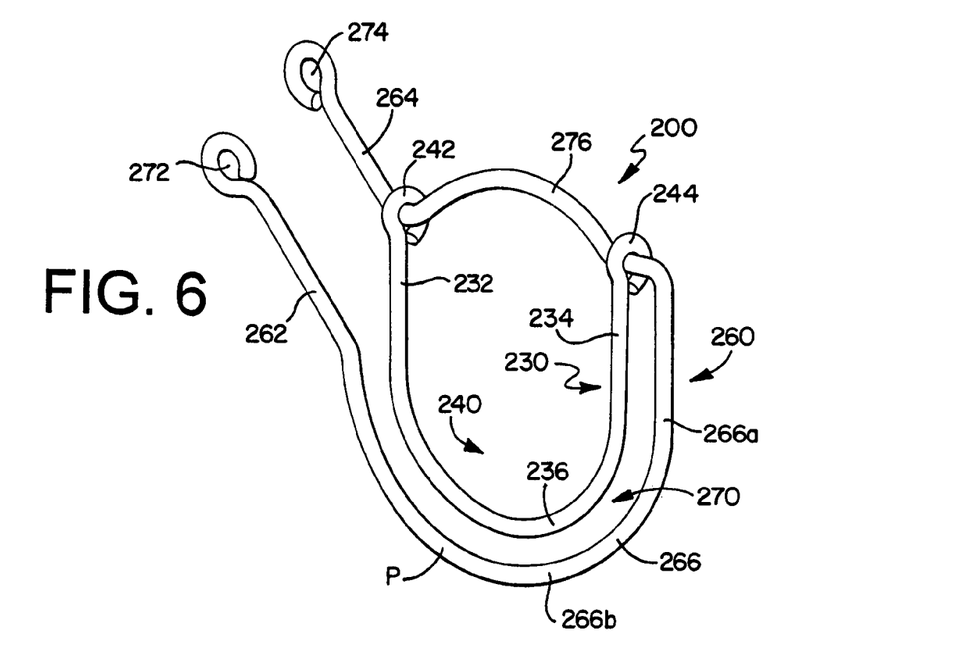
FIG. 6 is a perspective view of the second support apparatus of FIG. 2.

FIGS. 2, 3 and 6 show a second support apparatus 200. The support apparatus 200 is connected to and extends from the cooking assembly 15. In one embodiment, the support apparatus 200 is connected to and extends in a generally downward direction from the base assembly 52, for example the rear structure 52b of the base assembly 50. Alternatively, the support apparatus 200 downwardly extends from the front frame structure 52a. The support apparatus 200 includes a first member 230 and a second member 260, wherein the first member 230 is moveably connected to the second member 260. As explained below, the first member 230 defines a first receiver 240 configured to receive and support a first-sized fuel source or bottle FBI, and the second member 260 defines a second receiver 270 configured to receive and support a second-sized fuel source or bottle FB2. Accordingly, the support apparatus 200 can be selectively positioned to receive and support one of a variety of fuel sources while the fuel source is in fluid communication with the burner element of the cooking chamber 20.

The first member 230 includes a proximal segment 232, a distal segment 234 and an intermediate segment 236. Preferably, the intermediate segment 236 has a curvilinear configuration. At least an extent of the intermediate segment 236 defines a first receiver 240 that is configured to receive the first-sized fuel source FB1. The first receiver 240 has an engaging surface that engages a portion of the first fuel source FBI when it is received by the first receiver 240. Described in a different manner, the first receiver 240 is cooperatively dimensioned with the outer dimension or wall(s) of the first fuel source FBI wherein the first fuel source FBI is inserted in and supported by the receiver 240. As shown in FIG. 6, the proximal segment 232 has a connecting member or an eyelet 242 and the distal segment 234 has a connecting member or an eyelet 244. The connecting structures 242, 244 are utilized to operably connect the first member 230 to the second member 260. Specifically, the second member 260 extends through the connecting structures 242, 244 whereby the first member 230 is rotatable with respect to the second member 260. Although shown as an eyelet, the connecting structures 242, 244 can have a different configuration, such as a hook, to ensure operable connection between the first and second frame members 230, 260.

Figure 4:
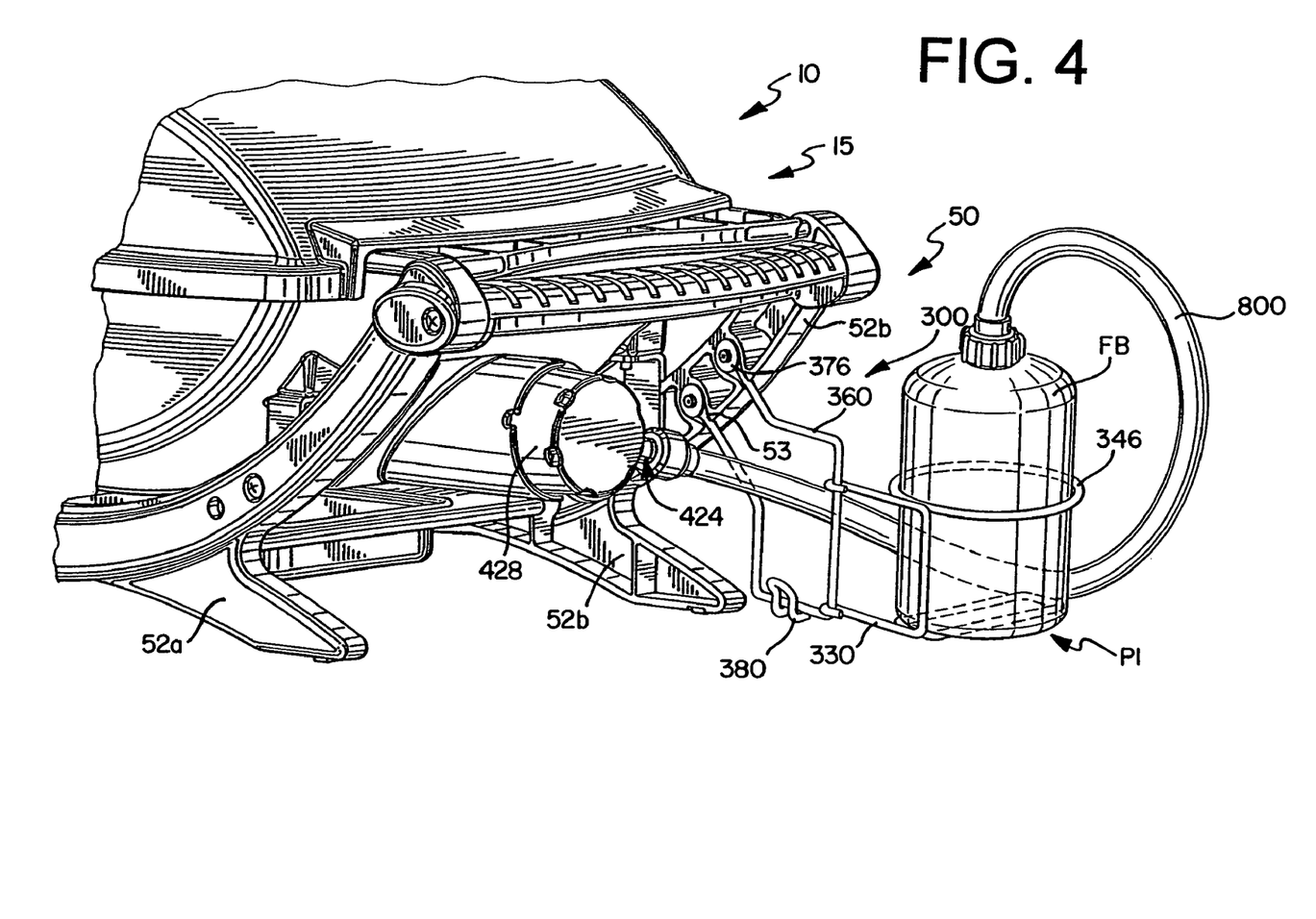
FIG. 4 is a partial perspective view of the barbecue grill assembly of FIG. 4 and a third support apparatus for a fuel sources, showing the support structure in a first position.

The second member 260 includes a proximal segment 262, a distal segment 264 and a intermediate segment 266. Preferably, the intermediate segment 266 has a curvilinear configuration. At least an extent of the intermediate segment 266 defines a second receiver 270 that is configured to receive the second-sized fuel source FB2. The second receiver 270 has an engaging surface that engages a portion of the second fuel source FB2 when it is received by the first receiver 270. Described in a different manner, the second receiver 270 is cooperatively dimensioned with the outer dimension or wall(s) of the second fuel source FB2 wherein the second fuel source FB2 is inserted in and supported by the receiver 270. As shown in FIG. 4, the proximal segment 262 has a connecting member or an eyelet 272 and the distal segment 264 has a connecting member or an eyelet 274. The connecting structures 272, 274 are utilized to operably connect the second member 260 to base assembly 50. Referring to FIG. 2, the rear frame structure 52b has at least one channel 53 that receives the proximal and distal segments 262, 264 of the second member 260. A fastener 276 extends through the connecting members 272, 274. Also, washers 278 are utilized to further secure the proximal and distal segments 262, 264 in the channels 53. Although shown as an eyelet, the connecting structures 272, 274 can have a different configuration, such as a hook, to ensure the securement of the second member 260 to the base assembly 50.

In addition to defining the second receiver 270, the intermediate segment 266 of the second member 260 includes an arched or raised component 276. The arched component 276 of the second member 260 generally extends between the first and second eyelets 242, 244 of the first member 230. As explained in greater detail below, during use of the second support apparatus 200, the arched component 276 interacts with the first and second receivers 240, 270 to further secure one of the fuel source bottles FB1, FB2. The intermediate segment 266 has a substantially vertical portion 266a and a curvilinear base portion 266b. Furthermore, the intermediate segment 266 defines a perimeter P and the first member 230 is positioned substantially within the perimeter P. Specifically, the proximal, distal and intermediate segments 232, 234, 236 are positioned substantially within the perimeter P.

In use, the support apparatus 200 can be selectively positioned to accommodate different-sized fuel source bottles. Referring to FIG. 2, the support apparatus 200 is in a first position P1 wherein a first-sized fuel source bottle FB1 is received by and positioned at a support angle θ (measured from surface supporting the barbecue grill assembly 10) by the support apparatus 200. During use of the barbecue grill assembly 10, the fuel bottle FB1 is in fluid communication with the regulator 430 in order to deliver fuel to the burner element. In the first position P1, the fuel bottle FB1 extends through the first receiver 240 and is supported by the first receiver 240 at the support angle θ. Therefore, the fuel bottle FB is held in place by the combination of the connection with the regulator 430 and the receiver 240 of the support apparatus 200. The support angle θ ensures the flow of the fuel from the fuel bottle FB1 to the regulator 430 and can vary between 5 and 60 degrees. In the first position P1, the intermediate segment 266 of the second member 260 is positioned below the fuel bottle FB1 and the first receiver 240. In the first position P1, the engaging surface of the first receiver 240 engages the outer wall of the fuel bottle FB1. When the fuel bottle FB1 is received by the first receiver 240, the fuel bottle FB1 is positioned between the intermediate segment 236 and the arched component 276 of the second member 260. The arched component 276 helps to maintain the fuel bottle FB1 in the first position P1 and prevent unwanted vertical movement of the fuel bottle FB1. In the first position P1, at least an extent of the first member 230 and/or the arched component 276 defines a support member arrangement with an inner perimeter that is cooperatively dimensioned with an outer wall or dimension of the first-sized fuel bottle FB1.

When a larger, second-sized fuel source bottle FB2 is utilized, the second support apparatus 200 can be selectively adjusted to a second position P2 (see FIG. 3) to accommodate that fuel bottle FB2. To move the support apparatus 200 between the first and second positions P1, P2, the first member 230 is rotated about the intermediate segment 266 of the second member 260. As shown in FIGS. 2 and 3, the fuel bottle FB2 has an increased diameter or outer wall dimension compared to that of the first fuel bottle FB1. In the second position P2, the second-sized fuel source bottle FB2 is received by and positioned at the support angle θ by the support apparatus 200. During use of the barbecue grill assembly 10, the fuel bottle FB2 is in fluid communication with the regulator 430 in order to deliver fuel to the burner element. In the second position P2, the fuel bottle FB2 extends through the second receiver 270 and is supported by the second receiver 270 at the support angle θ. Therefore, the fuel bottle FB is held in place by the combination of the connection with the regulator 430 and the receiver 270 of the support apparatus 200. In the second position P2, the engaging surface of the second receiver 270 engages the outer wall of the fuel bottle FB2. In the second position P2, the first member 230 extends vertically from the second member 260 and is positioned generally above the fuel bottle FB2. Preferably, in the second position P2, the first member 230 is positioned approximately 180 degrees from the second member 260. When the fuel bottle FB2 is received by the second receiver 270, the fuel bottle FB2 is positioned between the intermediate segment 266 and the arched component 276 of the second member 260. The arched component 276 helps to maintain the fuel bottle FB2 in the second position P2 and prevent unwanted vertical movement of the fuel bottle FB2. Accordingly, the support apparatus 200 can be selectively positioned in the first or second position P1, P2 to receive and support different-sized fuel source bottles FB1, FB2 while maintaining fluid communication with the burner element. In the second position P2, at least an extent of the second member 260 and/or the arched component 276 define a support member arrangement with an inner perimeter that is cooperatively dimensioned with an outer wall or dimension of the second-sized fuel bottle FB2.

Therefore, the support apparatus 200 is moveable between the first position P1 and the second position P2 depending upon the size or dimensions of the fuel bottle FB1, FB2. This provides an operator with greater flexibility is selecting a fuel bottle to use with the barbecue grill assembly 10.

Figure 5:
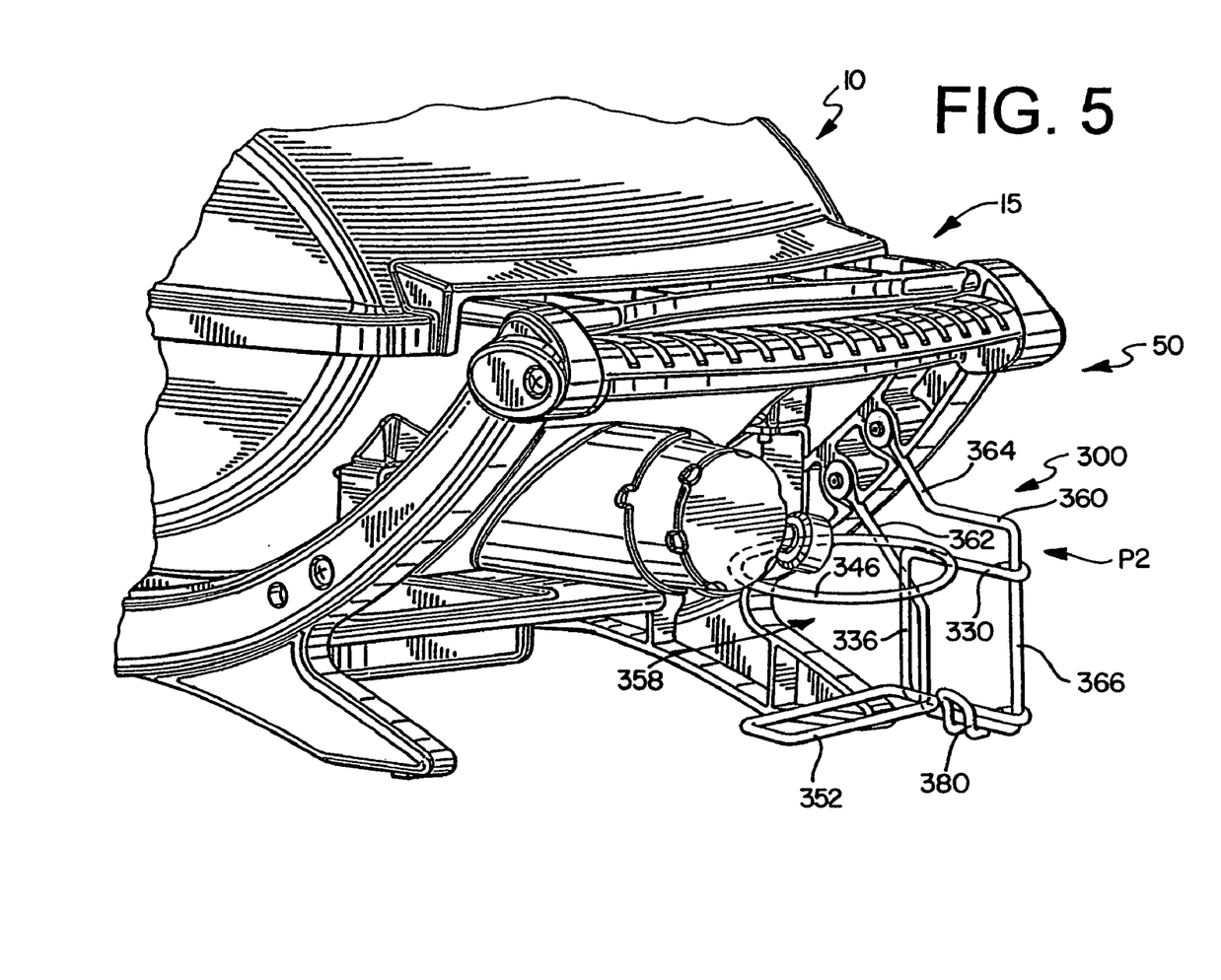
FIG. 5 is a partial perspective view of the barbecue grill assembly of FIG. 1 and the third support apparatus for a fuel source, showing the support structure in a second position.
Figure 7:
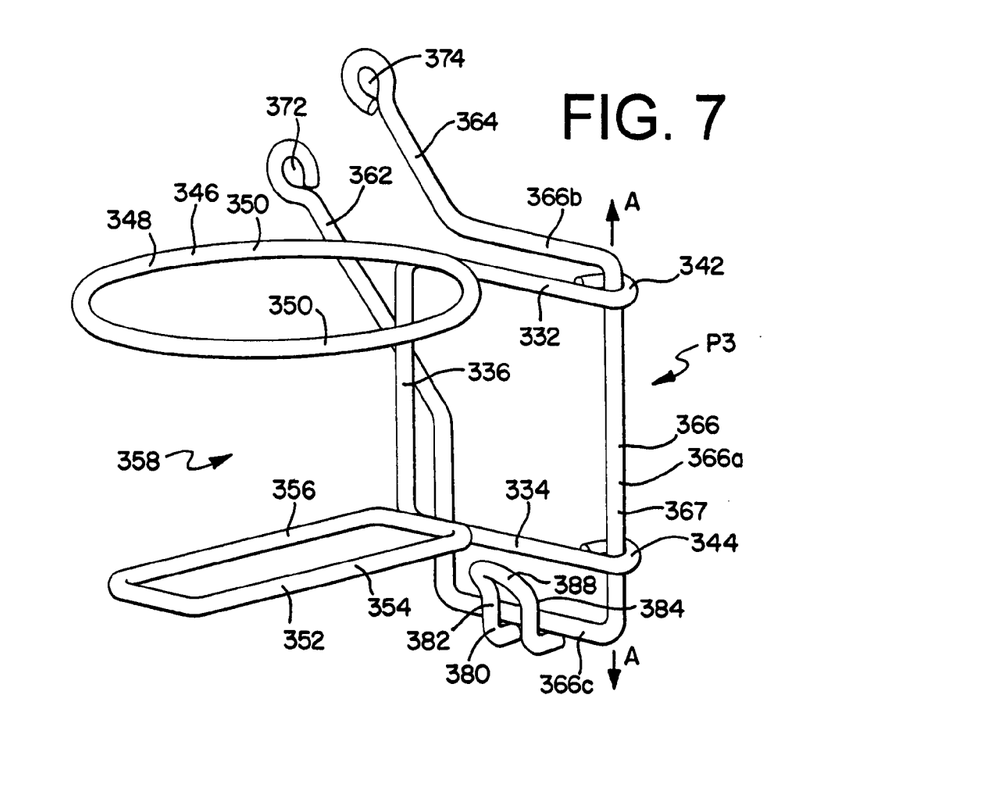
FIG. 7 is a perspective view of the third support apparatus of FIG. 5.

FIGS. 5–7 show a third support apparatus 300. The support apparatus 300 is connected to and extends from the cooking assembly 15. In one embodiment, the support apparatus 300 is connected to and extends in a generally downward direction from the base assembly 52, for example, the rear structure 52b of the base assembly 50. Alternatively, the support apparatus 300 downwardly extends from the front structure 52a of the base assembly 50. The support apparatus 300 includes a first member 330 and a second member 360, wherein the first member 330 is moveably connected to the second member 360. The second member 360 includes a locking member 380 that releasably secures the first member 330. As explained below, the first member 330 defines a receiver 340 that receives and supports a fuel source or bottle FB. Accordingly, the support apparatus 300 is moveable between a first or loading position P1 wherein the fuel source FB is inserted in the support apparatus 300, and a second or use position P2 wherein the fuel source FB is in fluid communication with the burner element of the cooking chamber 20. A hose 800 extends from the fuel bottle FB and connects with the gas manifold 424. Alternatively, a regulator is positioned between a first end of the hose 800 and the discharge end of the fuel bottle FB.

The first member 330 includes a proximal segment 332, a distal segment 334 and an intermediate segment 336 that extends between the proximal and distal segments 332, 334. As shown in FIG. 7, the proximal segment 332 has a connecting member or an eyelet 342 and the distal segment 334 has a connecting member or an eyelet 344. The connecting structures 342, 344 are utilized to operably connect the first frame member 330 to the second frame member 360. The first member 330 is moveable or rotatable about a generally vertical axis A—A, which is defined by an intermediate segment 366 of the second frame member 360. Specifically, the second member 360 extends through the connecting structures 342, 344 whereby the first member 330 is rotatable with respect to the second member 360. Although shown as an eyelet, the connecting structures 342, 344 can have a different configuration, such as a hook, to ensure operable connection between the first and second members 330, 360.

The first member 330 also includes a first holding element 346 affixed to a portion of the proximal segment 332. As shown in FIG. 7, the curvilinear holding element 346 is a loop or ring. Alternatively, the holding element 346 comprises two prongs spaced a distance apart. The first holding element 346 has an inner wall arrangement 348 wherein at least a portion of the arrangement 348 has opposed surfaces 350. The opposed surfaces 350 are separated and define an inner dimension ID that is cooperatively dimensioned with the outer wall dimension of the fuel source FB. The first member 330 further includes a second holding element 348 affixed to a portion of the distal segment 334. The first member 330 further includes a second holding element 352 affixed to a portion of the distal segment 334. As a result, the intermediate segment 336 extends substantially between the first holding element 346 and the second holding element 350. The second holding element 352 has an outer wall 354 wherein at least an upper extent of the outer wall defines an engaging surface 356 that engages a lower extent of the fuel bottle FB. The first and second holding elements 346, 352 define a receiver 358 that is configured to receive the fuel bottle FB. Thus, the receiver 358 is cooperatively dimensioned with the outer wall dimension of the fuel bottle FB whereby the receiver 358 engages and supports the fuel bottle, including during the movement between the first and second positions P1, P2. Alternatively, the second holding member 352 is configured similar to the first holding member 346, meaning that both members 346, 352 have a curvilinear configuration and define a ring-shaped receiver 358. In another alternative, the first and second holding members 346, 352 have connecting members similar to the connecting members 342, 344 that permit the holding members 346, 352 to be operably connected to the second member 360.

The second member 360 includes a proximal segment 362, a distal segment 364 and a intermediate segment 366. The intermediate segment 366 has a substantially vertical component 366a, about which the first member 330 rotates. In addition, the first member 330 is vertically moveable along an extent of the outer wall 367 of the intermediate segment 366. The intermediate segment 366 also has an upper horizontal component 366b and a lower horizontal component 366c. Referring to FIG. 7, the locking member 380 extends from the intermediate segment 366, preferably from the lower horizontal component 366c. The locking member 380 has an outer wall surface 382 and an inner wall surface 384. Also, the locking member 380 has peripheral portions 386 and an apex portion 388, which extends transverse to the peripheral portions 386. As explained in greater detail below, the locking member 380 releasably secures the first member 340 and prevents unwanted movement between the first and second positions P1, P2. Furthermore, in FIG. 7, the first member 330 is shown in an elevated position wherein the distal segment 334 is distanced from or positioned above the locking member 380. The proximal segment 362 has a connecting member or an eyelet 372 and the distal segment 364 has a connecting member or an eyelet 374. The connecting structures 372, 374 are utilized to operably connect the second member 360 to base assembly 50. Referring to FIGS. 4 and 5, the rear frame structure 52a has at least one channel 53 that receives the proximal and distal segments 362, 364 of the second member 260. A fastener 376 extends through the connecting members 372, 374. Also, washers 378 are utilized to further secure the proximal and distal segments 362, 364 in the channels 53. Although shown as an eyelet, the connecting structures 372, 374 can have a different configuration, such as a hook, to ensure the securement of the second member 360 to the base assembly 50.

In use, the support apparatus 300 is moveable between the first or loading position P1 (see FIG. 4) wherein the fuel source FB can be inserted into the receiver 340 of the support apparatus 300, and the second or use position P2 (FIG. 5) wherein the fuel source FB is in fluid communication with the burner element of the cooking chamber 20. Although the fuel source FB is omitted from the FIG. 5, it is understood that the fuel source FB, through the supply hose 800, is in fluid communication with the gas manifold 424, the regulator 430 and the burner element. The fuel bottle FB was omitted to show the interaction between the locking member 380 and the first member 330.

In the first or loading position P1 shown in FIG. 5, the support assembly 330 extends a distance from the base assembly 50 whereby there is a clearance sufficient to allow an extent of the fuel source FB to be inserted into the receiver 340. In the loading position P1, the proximal and distal segments 332, 334 extend from the intermediate segment 366 of the second member 360. Also, the intermediate segment 366 is positioned radially outward of the intermediate segment 366 of the second member 360. Consequently, there is no engagement between the locking member 380 and the distal segment 334. However, there is engagement between the first member 330, primarily the distal segment 334, and a corner region 366 of the intermediate segment of the first member 360. When the fuel source FB is inserted into the receiver 340, the opposed surfaces 350 of the inner wall arrangement 348 of the first holding element 346 engage the outer wall of the fuel source FB. The engagement between the first holding element 346 and the fuel source FB is facilitated by the fact that the inner dimension ID is cooperatively dimensioned with the outer wall dimension of the fuel source FB. In addition, the engaging surface 356 of the second holding element 352 engages a lower portion of the fuel bottle FB.

To move the support apparatus 300 from the first position P1 to the use or second position P2, the first member 330 is rotated into engagement with the locking member 380. Specifically, the first member 330 is rotated in a clockwise direction (viewed from above the support apparatus 300) such that the distal segment 334 engages the outer wall surface 386 of the locking member 380. Then, the first member 330 is raised or slid in a substantially vertical direction along the vertical component 366a of the intermediate segment 366 towards the upper horizontal component 366b. While the first member 330 is being slid along the vertical component 366a, the distal segment 334 slidingly engages the outer wall surface 386. Once the first member 330 is raised a distance sufficient to permit the distal segment 334 to clear the apex portion 388 of the locking member 380, the first member 330 is further rotated and brought into engagement with a second vertical component 366e and/or the distal segment 364 of the second member 360 to define an intermediate position P3 (see FIG. 7). In the intermediate position P3, the distal segment 334 is positioned above the locking member 380 defining a clearance there between. After the reaching the intermediate position P3, the first member 330 is released or lowered wherein the distal segment 334 engages the inner wall surface 384 of the locking member 380 to define the second position P2. In the second position P2, the distal segment 334 engages the lower horizontal component 366c of the intermediate segment 366. Described in a different manner, the distal segment 334 is stacked on the lower horizontal component 366c. In the second position P2, the distal segment 334 engages the inner wall surface 384 of the locking member 380, whereby further rotational movement of the first member 330 is substantially precluded.

Accordingly, the support apparatus 300 is moveable between the loading position P1 and the use position P2, however, the positive engagement between the locking member 380 and an extent of the first member 330 prevents unintended movement. Furthermore, when the support apparatus 300 is manipulated into the intermediate position P3 for movement between the loading position P1 and the use position P2, there is no engagement between the locking member 380 and the distal segment 334 of the first member 330. Therefore, an operator can precisely control the position of the support apparatus 300.

Figure 8:
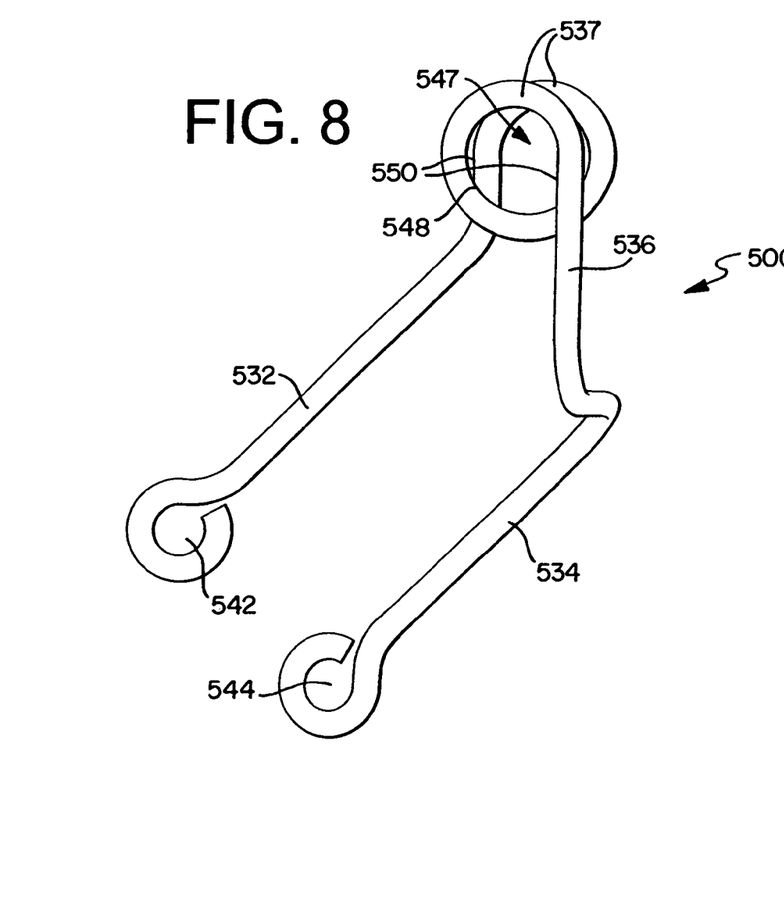
FIG. 8 is a perspective view a fourth support apparatus.
Figure 9:
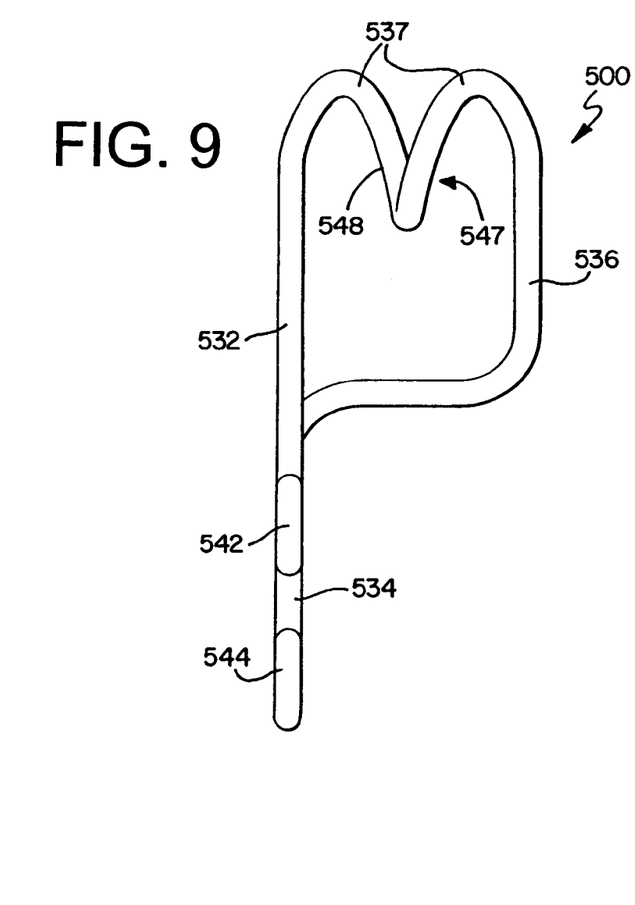
FIG. 9. is plan view of the support apparatus of FIG. 8.

FIGS. 8 and 9 show a fourth support apparatus 500. Like the previous support apparatuses, the support apparatus 500 is connected to and extends from the cooking assembly 15. The support apparatus 500 is configured to receive a generally flexible line or hose (similar to that shown in previous figures) extending between the fuel bottle FB and the gas manifold 424. Alternatively, the flexible line supplies fuel from a larger, conventional fuel tank. In one embodiment, the support apparatus 500 is connected to and extends in a generally downward direction from the base assembly 52, for example, the rear structure 52b of the base assembly 50. Alternatively, the support apparatus 500 downwardly extends from the front structure 52a of the base assembly 50. The support apparatus 500 provides an amount of strain relief for the hose during operation of the barbecue grill assembly 10.

The support apparatus 500 includes a proximal segment 532, a distal segment 534 and an intermediate segment 536 that extends between the proximal and distal segments 532, 534. As shown in FIG. 8, the proximal segment 532 has a connecting member or an eyelet 542 and the distal segment 534 has a connecting member or an eyelet 544. The connecting structures 542, 544 are utilized to operably connect the support apparatus 500 to the base assembly 50. The intermediate segment 536 has a curvilinear configuration with at least one coil 537 that defines a receiver 547 that is cooperatively dimensioned with the outer wall dimension of the hose. The intermediate segment 536 has an inner wall arrangement 548 wherein at least a portion of the arrangement 548 has opposed surfaces 550. The opposed surfaces 550 are separated and define an inner dimension ID that is cooperatively dimensioned with the outer wall dimension of the hose. As a result, the intermediate segment 536 receives an extent of the hose when the hose is connected between the fuel source and the gas distribution manifold 424.

Each of the support apparatuses 100, 200, 300, 500 can be fabricated from a variety of materials. For example, the first and/or second frame members can be fabricated from metal, plastic or a combination of both.

While a specific embodiment has been illustrated and described, numerous modifications come to mind without significantly departing from the spirit of the invention, and the scope of protection is only limited by the scope of the accompanying Claims.

I claim:

1. A barbecue grill assembly comprising:
   a cooking assembly having a cooking chamber with a burner element and a base assembly configured to support the cooking chamber;
   a support apparatus extending downwardly from the cooking assembly, the support apparatus having a first member defining a first receiver configured to receive a first-sized fuel container, the support apparatus further having a second member defining a second receiver configured to receive a second-sized fuel container;
   wherein the first member is operably connected to the second member and moveable between a first position wherein the first receiver receives a portion of a first-sized fuel container, and a second position wherein the second receiver receives a portion of the second-sized fuel container.

2. The barbecue grill assembly of claim 1 wherein in the first position, the first-sized fuel container is supported by the first receiver while maintaining fluid communication with the burner element.

3. The barbecue grill assembly of claim 1 wherein the second frame member extends from the frame assembly such that the first-sized fuel container is inclined in the first position.

4. The barbecue grill assembly of claim 3 wherein in the second position, the second-sized fuel container is supported by the second receiver while maintaining fluid communication with the burner element.

5. The barbecue grill assembly of claim 4 wherein the first frame member extends from the frame assembly such that the second-sized fuel container is inclined in the second position.

6. The support apparatus of claim 1 wherein in the second position, the first frame member extends upward from the intermediate segment of the second frame member.

7. The support apparatus of claim 1 wherein in the second position, the first frame member is positioned approximately 180 degrees from the second frame member.

8. A support apparatus for use with a barbecue grill assembly, the support apparatus comprising:
   a first member having a proximal segment, a distal segment and a curvilinear intermediate segment, wherein an extent of the intermediate segment defines a receiver that receives a first-sized fuel container;
   a second member having a proximal segment, a distal segment and a curvilinear intermediate segment, wherein an extent of the intermediate segment defines a receiver for a second-sized fuel container;
   wherein the first frame member is operably connected to the second frame member and moveable between a first position wherein the receiver of the first frame member receives a first-sized fuel source, and a second position wherein the receiver of the second frame member receives a second-sized fuel container.

9. The support apparatus of claim 8 wherein the first frame member is rotatably connected to the curvilinear intermediate segment of the second frame member.

10. The support apparatus of claim 8 wherein the proximal segment of the first frame member has an eyelet and the intermediate segment of the second frame member extends through the eyelet.

11. The support apparatus of claim 10 wherein the distal segment of the first frame member has an eyelet and the intermediate segment of the second frame member extends through the eyelet.

12. The support apparatus of claim 8 wherein the intermediate segment of the second frame member defines a perimeter and the first frame member is moveable to be positioned within the perimeter.

13. The support apparatus of claim 8 wherein an extent of the second frame member resides along a plane and an extent of the first frame member resides within the plane.

14. The support apparatus of claim 8 wherein the first and second frame members are comprised of elongated curvilinear segments of rigid material.

15. The support apparatus of claim 14 wherein the first and second frame members are formed from metal wire, and the operable connection of the frame members is provided by the ends of the first frame member forming a loop around the wire of the second frame member.

16. A barbecue grill assembly with a gas burner element for connection to a fuel bottle, the barbecue grill comprising:
cooking assembly having cooking chamber and a base assembly configured to support the cooking chamber;
a fuel bottle support apparatus extending downwardly from the cooking assembly, the support apparatus having a first member with a receiver configured to receive a fuel bottle, the support apparatus further having a second member with a locking member;
wherein the first member is operably connected to the second member and rotatable between a first position wherein the first receiver is positioned a distance from the base assembly and capable of receiving the fuel bottle, and a second position wherein the first member is releasably secured to the first member by the locking member.

17. The barbecue grill assembly of claim 16 wherein first member has a first holding element that defines an upper extent of the receiver.

18. The barbecue grill assembly of claim 17 wherein the first holding element has a curvilinear configuration.

19. The barbecue grill assembly of claim 17 wherein the first member has a second holding element that defines a lower extent of the receiver.

20. The barbecue grill assembly of claim 16 wherein the second member has at least one substantially vertical segment, the first member being rotatably connected thereto.

21. The barbecue grill assembly of claim 20 wherein the second member has at least one locking member that releasably secures the first member and prevents unwanted movement between the first and second positions.

22. The barbecue grill assembly of claim 21 wherein the first member slidingly engages an extent of the vertical segment of the second member to clear the locking member in order to move between the first and second positions.

23. The barbecue grill assembly of claim 20 wherein the first and second members are fabricated bent wire.

* * * * *